United States Patent

Stepanski et al.

[11] Patent Number: 5,254,199
[45] Date of Patent: Oct. 19, 1993

[54] PROCESS FOR BONDING SUBSTRATES OF GLASS FIBER REINFORCED POLYESTER RESIN

[75] Inventors: Horst Stepanski, Leverkusen; José Colinas-Martinez, Wermelskirchen; Rainer Trinks, Dormagen; Bernhard Jansen, Cologne; Hanns-Peter Müller, Bergisch Gladbach; Otto Ganster, Odenthal, all of Fed. Rep. of Germany

[73] Assignee: Bayer Aktiengesellschaft, Leverkusen, Fed. Rep. of Germany

[21] Appl. No.: 849,269

[22] Filed: Mar. 11, 1992

[30] Foreign Application Priority Data

Mar. 19, 1991 [DE] Fed. Rep. of Germany ....... 4108877

[51] Int. Cl.$^5$ .............................. C09J 5/02
[52] U.S. Cl. ..................... 156/307.3; 156/331.4; 428/298; 428/302; 528/53; 564/502; 564/511; 564/512
[58] Field of Search .......... 156/331.4, 307.3; 428/298, 302; 528/53; 564/502, 511, 512

[56] References Cited

U.S. PATENT DOCUMENTS

| | | | |
|---|---|---|---|
| 3,203,981 | 8/1965 | Hargrove | 564/502 |
| 3,647,513 | 3/1972 | Jackson . | |
| 3,812,003 | 5/1974 | Larson et al. . | |
| 4,004,050 | 1/1977 | Rabito et al. . | |
| 4,324,716 | 4/1982 | Reischl et al. . | |
| 4,624,996 | 11/1986 | Rizk et al. . | |
| 4,876,308 | 10/1989 | Melby et al. . | |
| 4,904,328 | 2/1990 | Beecher et al. | 156/307.3 |
| 4,923,756 | 5/1990 | Chung et al. . | |

FOREIGN PATENT DOCUMENTS 2021308  5/1991  Canada .

*Primary Examiner*—John J. Gallagher
*Attorney, Agent, or Firm*—Joseph C. Gil; Godfried R. Akorli

[57] ABSTRACT

Disclosed herein is an adhesive and a process for bonding with the adhesive containing an isocyanate prepolymer a), an isocyanate reactive component b) and a catalyst for the reaction of a) and b), characterized in that the catalyst comprises a compound corresponding to the following formula

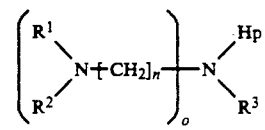

wherein
$R^1$ and $R^2$ may be identical of different and denote an alkyl group having 1 to 4 carbon atoms,
$R^3$ denotes a CHO group or H or alkyl group having 1 to 4 carbon atoms, optionally substituted with a CHO group,
n stands for an integer from 2 to 4,
o stands for 1 or 2,
p stands for 0 or 1 and
o+p=2.

15 Claims, No Drawings

PROCESS FOR BONDING SUBSTRATES OF GLASS FIBER REINFORCED POLYESTER RESIN

BACKGROUND OF THE INVENTION

This invention relates to a process for bonding parts made of unsaturated polyester resins. The bonding is carried out at room temperature without previous surface treatment.

When bonding molded parts of unsaturated polyester resins, in particular SMC and BMC, it is customary to carry out a preliminary treatment on the surface of the parts to be joined before they are bonded together. The purpose of this treatment is to roughen or activate the surface; in addition, it removes or renders inactive any external or internal mold release agent present on the surface. Suitable processes for this purpose have been described in numerous publications (see e.g. U.S. Pat. Nos. 3,647,513, 3,703,426, 3,838,093, 3,962,498, 4,004,050, 4,397,707, 3,714,127, 3,886,122, 3,933,051, 3,812,003, 4,247,676, 4,,336,298, 4,373,082, 4,390,678, 4,444,976, 4,552,934, 4,595,445 and 4,624,996).

Some publications describe adhesives and adhesive processes which enable polyester resin parts to be bonded without a preliminary surface treatment: a) "Fusor 320/321 and Fusor 320/322", Product Information, Lord Corp., Erie, Pa. (USA), Jun. 10, 1985; b) Anil B. Goerl, "New Pliogrip Hybrid Structural Adhesive", Effective adhesive Applications for the Automotive Eng., Soc. of Manufact. Eng., Oct. 21-23, 1986, The Westin Hotel, Detroit, Mich., USA; c) EP 0 328 808, d) U.S. Pat. No. 4,923,756, e) U.S. Pat. No. 4,876,308. All these publications, however, describe bonding processes in which setting of the adhesive takes place at elevated temperatures, preferably above 100° C.

It is an object of the present invention to provide a quick setting adhesive which ensures good substrate adherence on SMC and similar materials at low temperatures, preferably in the region of room temperature, without a preliminary surface treatment.

Setting under ambient temperature conditions has economical advantages, as it dispenses with the need for heating devices and the attendant consumption of energy. Moreover, heat curing in many cases cannot be carried out because of construction or manufacturing (technical) limitations, or because of distortions or surface defects ("read-through") due to differences in the coefficients of thermal expansion.

Priming has the economical disadvantage in that it entails an additional process step which is difficult to automate. Moreover, the substances used for priming are in many cases not harmless, from an industrial hygiene point of view, under the conditions of application normally employed in practice.

SUMMARY OF THE INVENTION

This invention relates to an adhesive for bonding substrates of glass fiber reinforced polyester resins (SMC or BMC), which is in particular characterized in that it is a two-component polyurethane adhesive containing an isocyanate component a), an isocyanate reactive component b) and a catalyst for the reaction of a) and b), characterized in that the catalyst comprises a compound corresponding to the following formula

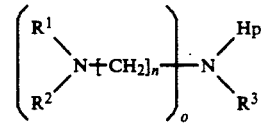

wherein
$R^1$ and $R^2$ may be identical or different and denote an alkyl group having 1 to 4 carbon atoms, in particular methyl and ethyl,
$R^3$ denotes a CHO group or H or an alkyl group having 1 to 4 carbon atoms, optionally substituted with a CHO group,
n stands for an integer from 2 to 4,
o stands for an integer from 1 or 2,
p stands for 0 or 1, and
o+p=2.

In a preferred embodiment, component b) contains the following:
b1) 100 parts by weight of at least one hydroxyl group-containing compound having a molecular weight of at least 400 an a hydroxyl functionality of at least 2,
b2) from 2–20 parts by weight of at least one aliphatic, aromatic or cycloaliphatic diamine or triamine having a molecular weight of at least 60 and optionally
b3) from 5–40 parts by weight of at least one hydroxyl group-containing low molecular weight chain lengthening agent having a molecular weight of at least 62 and a functionality of at least 2.

In a preferred embodiment, components a) and b) also contain conventional auxiliary agents and additives. In a particularly preferred embodiment, the catalyst is contained in component b). The catalyst is preferably used in such a quantity that component b) contains at least 0.005 g of tertiary amine nitrogen per 100 g, taking into account the tertiary nitrogen possibly present as component b1).

Also, the present invention relates to a process for bonding substrates of glass fiber reinforced polyester resin with the above adhesives.

DETAILED DESCRIPTION OF THE INVENTION

The isocyanate components may be compounds corresponding to the following formula:

$$Q(NCO)_n,$$

wherein
n=2 to 4, preferably 2 and
Q
denotes an aliphatic hydrocarbon group having 2 to preferably 6 to 10 carbon atoms,
a cycloaliphatic hydrocarbon group having 4 to 15, preferably 5 to 10 carbon atoms,
an aromatic hydrocarbon group having 6 to 15, preferably 6 to 13 carbon atoms or
an araliphatic hydrocarbon group having 8 to 15, preferably 8 to 13 carbon atoms.

The following are preferred polyisocyanates: hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3, 3,5-trimethyl-5-isocyanatomethylcyclohexane, hexahydro-1,3- and/or -1,4-phenylene diisocyanate, perhydro-2,4'- and/or 4,4'-diphenylmethane diisocyanate, 1,3-and 1,4-phenylene diisocyanate,2,4- and 2,6-tolylenediisocyanate and any mixtures of these isomers, diphenyl-methane-2,4'- and/or 4,4'-diisocyanate, naphthylene-1,5-diisocyanate, triphenylmethane-4,4'-diisocyanate, naphthylene-1,5-diisocyanate, triphenylmethane-4,4',4"-triisocyanate and polyphenylpolymethylene polyisocyanates which are obtainable by aniline-formaldehyde condensation followed by phosgenation.

Modification products of simple polyisocyanates are particularly suitable, i.e. polyisocyanates containing e.g. isocyanurate, carbodiimide, allophanate, biuret or uretdione structural units such as may be prepared by known processes of the state of the art from the simple polyisocyanates exemplified above which correspond to the above general formula. The relatively high molecular weight modified polyisocyanates include in particular the prepolymers containing isocyanate end groups known from polyurethane chemistry which have molecular weights in the range of from 400 to 10,000, preferably from 600 to 8000, in particular from 800 to 5000. These compounds are prepared in known manner by the reaction of excess quantities of simple polyisocyanates of the type exemplified above with organic compounds having at least two isocyanate reactive groups, in particular organic polyhydroxyl compounds. Suitable polyhydroxyl compounds of this type include simple polyhydric alcohols in the molecular weight range of from 62 to 599, preferably from 62 to 400, e.g. ethylene glycol, trimethylolpropane, propane-1,2-diol or butane-1,2-diol, and relatively high molecular weight polyether polyols and/or polyester polyols of the type known per se in polyurethane chemistry which have molecular weights of from 600 to 8000, preferably from 800 to 4000, and have at least two, generally 2 to 8, preferably 2 to 4 primary and/or secondary hydroxyl groups. Isocyanate prepolymers obtained, for example, from low molecular weight polyisocyanates of the type exemplified above and less preferred compounds containing isocyanate reactive groups, e.g. polythioether polyors, hydroxyl group-containing polyacetals, polyhydroxyl polycarbonates, hydroxyl-group containing polyester amides or hydroxyl group-containing copolymers of olefinically unsaturated compounds may, of course, also be used. Compounds containing isocyanate reactive groups suitable for the preparation of the isocyanate prepolymers, in particular compounds containing hydroxyl groups, include, for example, the compounds disclosed by way of example in U.S. Pat. No. 4,218,543, column 7, line 29 to column 9, line 25. For the preparation of isocyanate prepolymers, these compounds containing isocyanate reactive groups are reacted with simple polyisocyanates of the type exemplified above under conditions maintaining an NCO/OH equivalent ratio from about 1.5:1 to 20:1, preferably from 5:1 to 15:1. The isocyanate prepolymers generally have an isocyanate content of from 2.5 to 25% by weight, preferably from 6 to 22% by weight. It is clear from this that in the context of the present invention the terms "isocyanate prepolymers" and "prepolymers containing isocyanate end groups" denote both the reaction products as such and mixtures thereof with excess quantities of unreacted starting polyisocyanates, which are often referred to as "semi-prepolymers".

Starting compounds which are particularly preferred as the isocyanate component a) according to the invention are the commercial polyisocyanates conventionally used in polyurethane chemistry, i.e. hexamethylene diisocyanate, 1-isocyanato-3,3, 5-trimethyl-5-isocyanato-methylcyclohexane (isophorone diisocyanate, abbreviated: IPDI), 4,4'-diiso-cyanato-dicyclohexylmethane, 2,4-diisocyanatotoluene, commercial mixtures thereof with 2,6-diisocyanatotoluene, 4,4'-diisocyanatodiphenylmethane, mixtures thereof with the corresponding 2,4'-and 2,2'-isomers, polyisocyanate mixtures of the diphenylmethane series which are obtainable in known manner by the phosgenation of aniline/formaldehyde condensates, the bioret group-containing or isocyanurate group-containing modification products of these commercial polyisocyanates on the one hand and the simple polyols and/or polyether polyols and/or polyester polyols mentioned above as examples, and any mixtures of such polyisocyanates.

Isocyanate prepolymers of isocyanates selected from the diphenylmethane series with polyethers having a functionality of 2 or 3 and molecular weights of from 500 to 10,000 g/mol, especially from 1000 to 8000 g/mol, in particular from 1500 to 7000 g/mol, are especially preferred. The auxiliary agents and additives optionally used include, for example, fillers, dyes and pigments.

The following are examples of suitable fillers, in particular fillers which have a reinforcing action: Silicaceous minerals, for example laminated silicates such as antigorite, serpentine, hornblende, amphibole, chrisotile or talc; metal oxides such as kaolin, aluminum oxides, titanium oxides and iron oxides, metal salts such as chalk and heavy spar and inorganic pigments such as cadmium sulphide or zinc sulphide, glass, powdered asbestos, etc. Natural and synthetic fibrous materials such as asbestos, wollastonite and especially glass fibers of various lengths which may or may not have been sized are preferably used.

Fillers may be used singly or as mixtures.

If fillers are used, they are advantageously added to the reaction mixture in quantities of up to 50% by weight, preferably up to 30% by weight, based on the weight of components a) and b).

Further details concerning conventional auxiliary agents and additives may be found in the technical literature, for example the monograph by J. H. Saunders and K. C. Frisch, "High Polymers", Volume XVI, Polyurethanes, Parts 2 and 7, published by Interscience Publishers, 1962 and 1964.

Component b1) of the system according to the invention preferably contains at least one organic compound having a molecular weight of from 400 to 12,000, preferably from 400 to 6000, with 2 to 8, preferably 2 to 5 hydroxyl functions. The molecular weights given here may be calculated from the OH number of the substance according to the following equation:

$$\text{Molecular weight} = \frac{56,000}{\text{OH-number}} \times \text{functionality}$$

The compounds used may be, for example, polyhydroxypolyethers of the type known from polyurethane chemistry, which may be obtained by the alkoxylation of suitable starter molecules such as ethylene glycol, diethylene glycol, 1,4-dihydroxybutane, 1,6-dihydroxyhexane, trimethylolpropane, glycerol, pentaerythritol, sorbitol or sucrose. The following may also function as starters: Ammonia or amines such as ethylene diamine, hexamethylene diamine, 2,4-diaminotoluene, aniline or amino alcohols. Alkoxylation is carried out using propylene oxide and/or ethylene oxide in any sequence.

Polyester polyols obtainable in known manner by the reaction of the low molecular weight alcohols exemplified above with polybasic carboxylic acids such as adipic acid, phthalic acid, hexahydrophthalic acid, tetrahydrophthalic acid or the anhydrides of these acids are also suitable.

Relatively high molecular weight polyhydroxyl polyethers in which high molecular weight polyadducts or polycondensates or polymers are present in a finely dispersed, dissolved or grafted form are also suitable. Such modified polyhydroxyl compounds are obtained, for example, when polyaddition reactions (e.g. reactions between polyisocyanates and aminofunctional compounds) or polycondensation reactions (e.g. between formaldehyde and phenols and/or amines) take place in situ in the compounds containing hydroxyl groups. Such processes are described in, for example, DE-AS 1 168 075 and 1 260 142 and DE-A-2 324 134, 2 423 984, 2 512 385, 2 513 815, 2 550 796, 2 550 797, 2 550 833, 2 550 862, 2 633 293 and 2 639 254 but according to U.S. Pat. No. 3,869,413 and DE-A-2 550 860 these modified polyhydroxyl compounds may equally well be obtained by mixing a previously prepared aqueous polymer dispersion with a polyhydroxyl compound and then removing the water from the mixture.

Polyhydroxyl compounds modified by vinyl polymers, such as may be obtained, for example, by the polymerization of styrene and acrylonitrile in the presence of polyethers (U.S. Pat. No. 3,383,351, 3,304,273, 3,523,093 and 3,110,695 and DE-A-1 152 536) or polycarbonate polyols (DE-PS 1 769 795; U.S. Pat. No. 3,637,909) are also suitable for use as component b) in the process according to the invention. Plastics with exceptional flame resistance are obtained by using polyether polyols which have been modified according to DE-A-2 442 101, 2 644 922 or 2 646 141 by graft polymerization with vinyl phosphonic acid esters and optionally (meth)acrylonitrile, (methyl)acrylamide or OH functional (methyl)acrylic acid esters.

Representatives of the above-mentioned compounds to be used as compounds b1) according to the invention are described e.g. in High Polymers, Volume XVI, "Polyurethanes Chemistry and Technology" by Saunders-Frisch, Interscience Publishers, New York, London, Volume I, 1962, pages 32–42 and pages 44-54 and Volume II, 1964, pages 5–6 and 198–199 and in Kunststoff-Handbuch, Volume VII, Vieweg-Höchtlen, Carl-Hanser-Verlag, Munich, 1966, e.g. on pages 45–71.

Preferred amines b2) have a molecular weight of from 60 to 300. Diamines such as 1,4-diaminobenzene, 2,4-diaminotoluene and 2,4'- and/or 4,4'-diaminodiphenylmethane are particularly preferred, and especially diamines containing an alkyl substituent in at least one ortho-position to the amino group, in particular those which have at least one alkyl substituent in the ortho-position to the first amino group and two alkyl substituents, each with 1 to 3 carbon atoms, in the ortho-position to the second amino group. Those which have an ethyl, n-propyl and/or isopropyl substituent in at least one ortho-position to the amino groups and optionally methyl substituents in other ortho-positions to the amino groups are especially preferred. These preferred and especially preferred diamines include 2,4-diaminomesitylene, 1,3,5-triethyl-2, 4-diaminobenzene, 1,3,5-triisopropyl-2,4-diaminobenzene, 1-methyl-3,5-diethyl-2,4-diaminobenzene and commercial mixtures thereof with 1-methyl-3,5-diethyl-2,6-diaminobenzene, 4,6-dimethyl-2-ethyl-1,3-diaminobenzene, 3,5,3', 5'-tetraethyl-4,4'-diaminodiphenylmethane, 3,5,3', 5'-tetraisopropyl-4,4'-diaminodiphenylmethane and 3,5-diethyl-3', 5'-diisopropyl-4,4'-diaminodiphenylmethane. Any mixtures of such aromatic diamines may also be used.

Isophorone diamine, bis-(4-aminocyclohexyl)-methane, 1,4-diaminocyclohexane, ethylenediamine and its homologues and piperazine are particularly preferred aliphatic diamines.

Low molecular weight polyhydric alcohols in the molecular weight range of from 62 to 400 are particularly preferred polyols b3). These include the substances already mentioned under b1) as starter molecules, such as ethylene glycol, diethylene glycol, 1,4-dihydroxybutane, 1,6-dihydroxyhexane, trimethylolpropane, glycerol, pentaerythritol, sorbitol or saccharose. Polyhydric alcohols having a functionality of 2 are particularly preferred.

Preferred catalysts according to the invention are shown below:

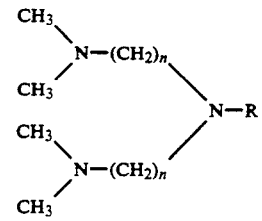

wherein n=2 or 3 and R=H, CHO or CH₃.

The following catalysts are particularly preferred:

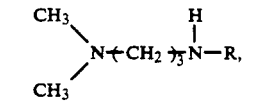

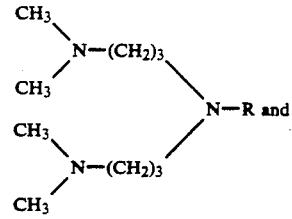

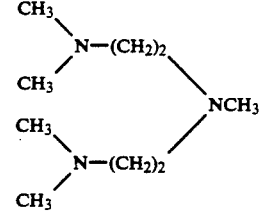

wherein R=CHO or H.

The above mentioned catalysts have the advantage of imparting improved storage stability to the polyol mixtures to which they are added. This means that effects such as phase separations and depositions of liquid components are for the most part prevented.

The bonding process according to the invention is suitable in particular for bonding plastics, metals, wood and glass.

The two-component polyurethane adhesive is preferably used by continuously mixing the two components a) and b) either in a stirrer mixer or in a static mixer or a counterflow mixer and then immediately applying the adhesive as a bead to at least one of the substrates which are to be bonded. A preliminary treatment of the substrate surfaces for cleaning or roughening or for some other purpose is in many cases unnecessary. The quantitative ratios of isocyanate component to polyol component follow the general principles of isocyanate chemistry; a slight excess of isocyanate is employed (isocyanate index in the range of from 100 to 125, preferably from 100 to 115).

The substrates to which the adhesive has been applied are placed together, fixed and either left to harden at room temperature or subjected to a hardening process at an elevated temperature. The state of being firm to handling can be reached more quickly at elevated temperatures than at room temperature.

The required open time or hardening time can be varied within wide limits by choice of the hardening temperature and choice of catalyst b4).

Another advantage of the adhesive according to the invention is that it can be processed free from solvent.

EXAMPLES

The following abbreviations are used hereinafter:

Isocyanate 1 (crude MDI)

4,4'-Diisocyanato diphenylmethane mixed with its isomers and higher homologs as obtained by the phosgenation of aniline-formaldehyde condensates, NCO content: 30.4%.

Isocyanate 2

Pure 4,4'-diisocyanato diphenylmethane containing partially carbodiamidized components, NCO content: 30%.

Polyether 1

By analogy with Example 1 of DE-A-2 638 759, a filler polyether is prepared for which 5070 parts by weight of a polyether polyol with OH number 35 prepared by the propoxylation of trimethylolpropane and ethoxylation of the propoxylation product (PO:EO ratio=83:17) is used as "solvent", only 380 parts by weight of hydrazine hydrate are used instead of 670 parts by weight of hydrazine hydrate and only 1320 parts by weight of tolylene diisocyanate are used instead of 2310 parts by weight of the diisocyanate.

A polyether containing 20% by weight of organic filler and having a hydroxyl number of 28 mg KOH/G is obtained.

Polyether 2

A polyether polyol started with trimethylolpropane and reacted with propylene oxide with subsequent ethoxylation of the propoxylation product (PO:EO ratio =86.5:13.5); OH number: 35 mg KOH/G.

Polyether 3

A polyether polyol started with trimethylolpropane, reacted with propylene oxide to form a propoxylation product which is then ethoxylated (PO:EO ratio=82.5:17.5); OH number: 28 mg KOH/G.

IPDA

Cycloaliphatic diamine having the following structure:

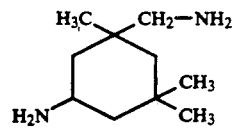

Zeolite paste

A 50% zeolite suspension in castor oil.

Catalyst

Tertiary amine catalyst having the following structure

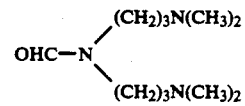

Prepolymer 1 (Comparison Example)

750 Parts by weight of isocyanate 1 are introduced into the reaction vessel at 60° C. and 247 parts by weight of polyether 2 are added dropwise within one hour. After all the polyether 2 has been added, stirring is continued at 60° C. until the isocyanate content has fallen to 22.5%.

Prepolymer 2 (according to the invention)

770 Parts by weight of isocyanate 2 are introduced into the reaction vessel at 60° C. and 235 parts by weight of polyether 2 are added dropwise within one hour. After all the polyether 2 has been added, stirring is continued at 60° C. until the isocyanate content is 22.5%.

Prepolymer 3 (according to the invention)

750 Parts by weight of isocyanate 2 are introduced into the reaction vessel at 60° C. and 204.3 parts by weight of polyether 3 are added dropwise within one hour. After all the polyether 3 has been added, stirring is continued at 60° C. until the isocyanate content is 22.5%.

Polyol mixture 1

100 Parts by weight of polyether 1, 10 parts by weight of butane-1,4-diol, 15 parts by weight of cis-butene-1, 4-diol, 2 parts by weight of IPDA, 6 parts by weight of zeolite paste and 0.4 parts by weight of the aminic catalyst are brought together and homogeneously mixed. The OH number of the mixture is 269 mg KOH/g.

Polyol mixture 2

100 Parts by weight of polyether 1, 25 parts by weight of butane-1,4-diol, 2 parts by weight of IPDA, 6 parts by weight of zeolite paste and 0.4 parts by weight of the aminic catalyst are brought together and mixed homogeneously. The OH number of the mixture is 269 mg KOH/g.

Parts to be joined

Glass fiber reinforced polyester resin: SMC Type 832 (DIN 16 913) of Fibron, Bretten, W.-Germany (4 mm in thickness). Test samples 40 mm in length and 20 mm in width are cut out of the pressed boards. The dust produced from cutting is removed by washing in desalted water without cleaning additives. After drying, the test samples are bonded without further surface treatment.

Table of mixtures for the reaction of Polyol mixtures 1 and 2 with Prepolymers 1, 2 and 3

| Example | Polyol mixture | Prepolymer | Index | Remarks |
|---------|----------------|------------|-------|---------|
| 1 | 1 | 3 | 115 | according to the invention |
| 2 | 1 | 2 | 115 | according to the invention |
| 3 | 1 | 1 | 115 | Comparison Example |
| 4 | 2 | 3 | 115 | according to the invention |

Results of the bonding tests in the tensile shear test

Joints with single shear overlap are produced from the SMC parts for testing the shear tension strengths according to DIN 53 283. The thickness of the bonding joint was 0.8 mm, the width of the sample was 20 mm and the length of overlap was 10 mm. Setting of the adhesives took place at room temperature and the tensile shear strength was also determined at room temperature.

| Example | 1 | 2 | 3 | 4 |
|---------|---|---|---|---|
| Average value of shear tensile strength [N/mm$^2$] | 8.1 | 7.5 | 7.4 | 8.3 |
| Standard deviation from 10 measurements | 0.9 | 1.2 | 1.5 | 1.2 |
| Assessment of failure | 100% FT | 70% FT 30% A | 100% A | 100% FT |

FT = Failure of joints due to tearing out of fibers ("fiber tear")
A = Adhesion failure

What is claimed is:

1. An adhesive containing an isocyanate prepolymer a), an isocyanate reactive component b) and a catalyst for the reaction of a) and b), characterized in that the catalyst comprises a compound corresponding to the formula:

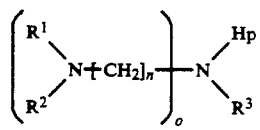

wherein
R$^1$ and R$^2$ may be identical or different and denote an alkyl group having 1 to 4 carbon atoms,
R$^3$ denotes a CHO group or H or alkyl group having 1 t 4 carbon atoms, optionally substituted with a CHO group,
n stands for an integer from 2 to 4.
o stands for 1 or 2,
p stands for 0 or 1 and
o+p=2.

2. An adhesive according to claim 1, characterized in that the isocyanate component a) is liquid at room temperature.

3. An adhesive according to claim 1 characterized in that the isocyanate component a) is an isocyanate prepolymer based on an isocyanate of the diphenylmethane series or a derivative thereof.

4. An adhesive according to claim 3, characterized in that the isocyanate prepolymer is a reaction product of an isocyanate of the diphenylmethane series with polyether polyols having a functionality of 2 or 3 and molecular weight of from 400 to 10,000 g/mol.

5. Adhesive according to claim 1, characterized in that component b) contains
b1) a polyether polyol obtainable by the alkoxylation of trimethylolpropane,
b2) a cyclohexane diamine,
b3) a butanediol and/or butenediol.

6. An adhesive according to claim 1 containing an isocyanate prepolymer a), an isocyanate reactive component b) and a catalyst for the reaction of a) and b), characterized in that the catalyst comprises a compound corresponding to the following formula

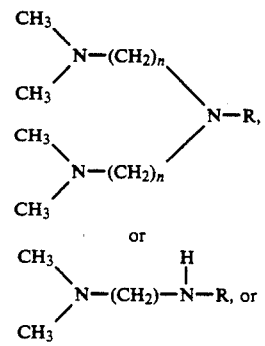

a mixture thereof,
wherein
R denotes a CHO group or H or alkyl group having 1 to 4 carbon atoms, optionally substituted with a CHO group,
n stands for an integer from 2 to 3.

7. An adhesive according to claim 6, characterized in that component b) contains
b1) 100 parts by weight of at least one hydroxyl group-containing compound having a molecular weight of at least 400 and a hydroxyl functionality of at least 2
b2) from 2-20 parts by weight of at least one aliphatic, aromatic or cycloaliphatic diamine or triamine having a molecular weight of at least 60 and optionally
b3) from 5-40 parts by weight of at least one hydroxyl group-containing low molecular weight chain extender having a molecular weight of at least 62 and at most 400 and a functionality of at least 2.

8. A process for bonding substrates of glass fiber reinforced polyester resin comprising applying to a surface of at least one substrate the adhesive as recited in claim 1, and contacting said surface with a surface of another substrate to which the adhesive is optionally applied.

9. A process according to claim 8, characterized in that the isocyanate component a) is liquid at room temperature.

10. A process according to claim 9 characterized in that the isocyanate component a) is an isocyanate prepolymer based on an isocyanate of the diphenylmethane series or a derivative thereof.

11. A process according to claim 10, characterized in that the isocyanate prepolymer is a reaction product of an isocyanate of the diphenylmethane series with polyether polyors having a functionality of 2 or 3 and molecular weights of from 400 to 10,000 g/mol.

12. A process according to claim 8, characterized in that the catalyst comprises a compound corresponding to the following formula

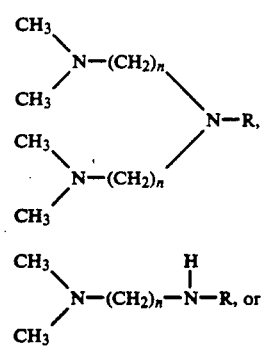

a mixture thereof,
wherein $n=2$ or 3 and $R=H$, CHO or $CH_3$.

13. A process according to claim 8, characterized in that an excess of isocyanate groups over isocyanate reactive groups is present.

14. A process according claim 8, characterized in that the catalyst is present in a quantity corresponding to at least 0.005 g of tertiary amine nitrogens per 100 g of component b).

15. A process according to claim 8, characterized in that after contacting the substrates with each other, the adhesive thereon is cured at room temperature.

* * * * *